(12) United States Patent
Oyman et al.

(10) Patent No.: US 11,936,707 B2
(45) Date of Patent: Mar. 19, 2024

(54) SIGNALING CODEC MODE NOTIFICATIONS FOR MULTIMEDIA TELEPHONY SESSIONS

(71) Applicant: Apple Inc., Cupertino, CA (US)

(72) Inventors: Ozgur Oyman, Palo Alto, CA (US); Thomas Luetzenkirchen, Taufkirchen (DE); Usharani Ayyalasomayajula, Bangalore (IN); Sudhir Shankar Pola, Bangalore (IN); Fabrice Plante, Hillsboro, OR (US); Ganesh Vijayan, Bangalore (IN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/290,659

(22) PCT Filed: Oct. 31, 2019

(86) PCT No.: PCT/US2019/059230
§ 371 (c)(1),
(2) Date: Apr. 30, 2021

(87) PCT Pub. No.: WO2020/092818
PCT Pub. Date: May 7, 2020

(65) Prior Publication Data
US 2021/0409475 A1 Dec. 30, 2021

Related U.S. Application Data

(60) Provisional application No. 62/755,143, filed on Nov. 2, 2018.

(51) Int. Cl.
*H04L 65/70* (2022.01)
*H04L 65/1066* (2022.01)
(Continued)

(52) U.S. Cl.
CPC .......... *H04L 65/70* (2022.05); *H04L 65/1066* (2013.01); *H04L 65/1104* (2022.05); *H04L 65/65* (2022.05)

(58) Field of Classification Search
None
See application file for complete search history.

(56) References Cited

U.S. PATENT DOCUMENTS

| 8,471,890 B1 * | 6/2013 | Golas | G06Q 50/01 |
| | | | 348/14.09 |
| 8,693,320 B2 * | 4/2014 | Furbeck | H04W 28/02 |
| | | | 370/229 |

(Continued)

FOREIGN PATENT DOCUMENTS

| CN | 101686178 A | 3/2010 |
| CN | 104221429 A | 12/2014 |

(Continued)

OTHER PUBLICATIONS

Wenger S. et al., Codec Control Message in the RTP Audio-Visual Profile with Feedback(AVPF), Feb. 2008, RFC 5104, pp. 1-64 (Year: 2008).*

(Continued)

*Primary Examiner* — Backhean Tiv
(74) *Attorney, Agent, or Firm* — Sterne, Kessler, Goldstein & Fox P.L.L.C.

(57) ABSTRACT

Methods, systems, and storage media are described for providing codec mode notification (CMN) messages for speech to be signaled from a sender to a receiver. Other embodiments may be described and/or claimed.

20 Claims, 9 Drawing Sheets

(51) Int. Cl.
*H04L 65/1104* (2022.01)
*H04L 65/65* (2022.01)

(56) References Cited

U.S. PATENT DOCUMENTS

| | | | | |
|---|---|---|---|---|
| 9,401,975 | B2* | 7/2016 | Hori | H04L 69/08 |
| 10,431,234 | B2* | 10/2019 | Jung | G10L 19/22 |
| 10,834,146 | B2* | 11/2020 | Hori | H04L 65/70 |
| 11,134,538 | B2* | 9/2021 | Oyman | H04W 80/10 |
| 11,412,021 | B2* | 8/2022 | Shin | H04L 65/65 |
| 2002/0163908 | A1* | 11/2002 | Lakaniemi | H04W 88/181 |
| | | | | 370/503 |
| 2003/0063569 | A1* | 4/2003 | Kalliokulju | H04L 65/80 |
| | | | | 370/252 |
| 2007/0183323 | A1* | 8/2007 | Hannu | H04W 8/04 |
| | | | | 370/235 |
| 2008/0117906 | A1* | 5/2008 | Xie | H04L 69/04 |
| | | | | 370/477 |
| 2009/0110006 | A1* | 4/2009 | Yue | H04H 20/18 |
| | | | | 370/512 |
| 2010/0318670 | A1* | 12/2010 | Al-Shalash | H04L 65/1016 |
| | | | | 709/229 |
| 2011/0141890 | A1 | 6/2011 | Giaretta et al. | |
| 2011/0170410 | A1* | 7/2011 | Zhao | H04L 43/0894 |
| | | | | 370/232 |
| 2013/0188758 | A1* | 7/2013 | Zopf | H04L 1/22 |
| | | | | 375/343 |
| 2013/0230057 | A1* | 9/2013 | Hori | H04W 36/0083 |
| | | | | 370/466 |
| 2013/0272194 | A1 | 10/2013 | Keller et al. | |
| 2015/0092575 | A1* | 4/2015 | Khay-Ibbat | H04L 65/65 |
| | | | | 370/252 |
| 2016/0165185 | A1* | 6/2016 | Oyman | H04N 19/167 |
| | | | | 348/14.08 |
| 2018/0048748 | A1* | 2/2018 | Lundström | H04L 65/70 |
| 2019/0007464 | A1* | 1/2019 | Hori | H04L 65/1045 |
| 2019/0182741 | A1* | 6/2019 | Oyman | H04L 65/1069 |
| 2019/0215729 | A1* | 7/2019 | Oyman | H04L 65/1016 |
| 2019/0274186 | A1* | 9/2019 | Oyman | H04M 7/0063 |
| 2020/0236154 | A1* | 7/2020 | Ragot | H04L 1/0023 |
| 2021/0258363 | A1* | 8/2021 | Ragot | H04L 69/24 |
| 2021/0409475 | A1* | 12/2021 | Oyman | H04L 65/1086 |

FOREIGN PATENT DOCUMENTS

| | | |
|---|---|---|
| KR | 10-2015-0121641 A | 10/2015 |
| WO | WO 2017/176690 A1 | 10/2017 |
| WO | 2018/041343 A1 | 3/2018 |
| WO | 2018/085668 A1 | 5/2018 |

OTHER PUBLICATIONS

Sjoberg J. et al., RTP Payload Format and File Storage Format for the Adaptive Multi-Rate(AMR) and Adaptive Multi-Rate(AMR-WB) Audio Codecs, Apr. 2007, RFC 4867, pp. 1-59 (Year: 2007).*
International Search Report and Written Opinion directed to related International Application No. PCT/US2019/059230, dated Feb. 27, 2020, 10 pages.
3GPP; TSG SA; IP Multimedia Subsystem (IMS); Multimedia Telephony; Media handling and interaction (Release 15), 3GPP TS 26.114 V15.4.0, Sep. 21, 2018 sections 6.2.5.1-10.7.3.3, A.4.2e; and figure 10.7-2.
3GPP: TSG SA; Study on enhanced Voice over LTE (VoLTE) performance (Release 15), 3GPP TR 26.959 V15.0.0, Jun. 22, 2018 section 8.2.2.4.
Extended European Search Report for Application No. 19880170.6 dated Nov. 5, 2021, 11 pages.
Westerlund, M., et al., "Codec Operation Point RTCP Extension, draft-westerlund-avtext-codec-operation-point-01," Codec Operation Point RTCP Extension; Draft-Westerlund-Avtext-Codec-Operation-Point-01.TXT, Internet Engineering Task Force, IETF; Standardworkingdraft, Internet Society (ISOC) 4, Rue Des Falaises CH-1205 Geneva, Switzerland, Oct. 22, 2012, pp. 1-76, XP015088432.
3GPP TSG CT4 Meeting #52, "Handling of AVPF rtcp-fb SDP attribute," C4-110700, Feb. 21-25, 2011, vol. CT WG4, Nokia Siemens Networks, 10 pages, XP050484422.

* cited by examiner

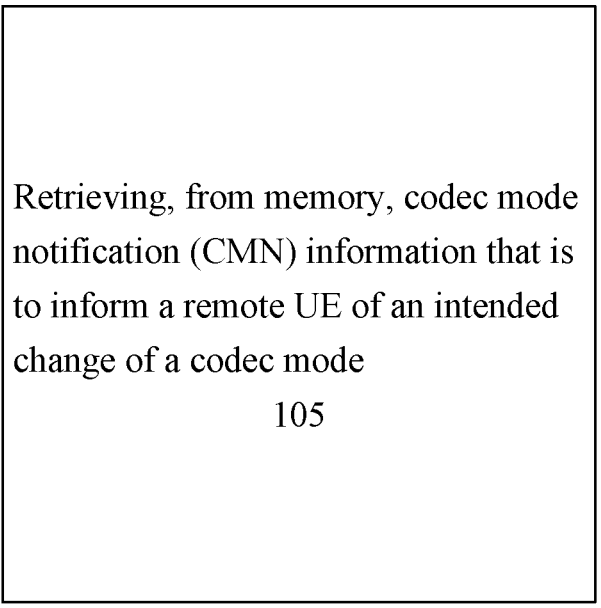
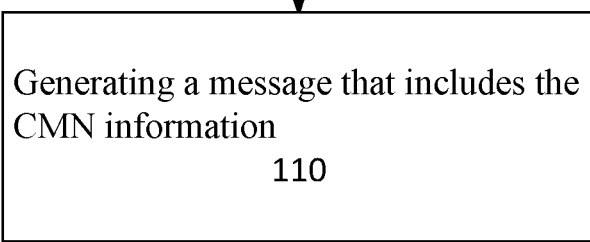
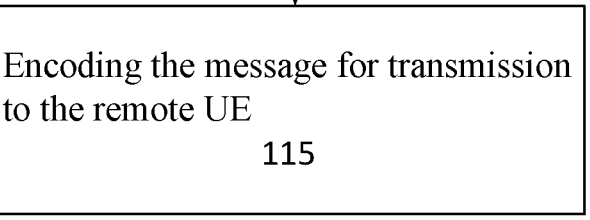
FIG. 1

200

Receiving, by a first UE from a second UE, a codec mode notification (CMN) message that includes information that is to inform a first UE of an intended change of a codec mode
205

Generating, by the first UE, a confirmation message based on the CMN message
210

Encoding the confirmation message for transmission to the second UE
215

FIG. 2

```
┌─────────────────────────────────┐
│ Generating an application layer │
│ message that includes codec     │
│ mode notification (CMN)         │
│ information for informing a     │
│ remote UE of an intended change │
│ of a codec mode                 │
│              305                │
└─────────────────────────────────┘
                │
                ▼
┌─────────────────────────────────┐
│ Encoding the application layer  │
│ message for transmission to the │
│ remote UE                       │
│              310                │
└─────────────────────────────────┘
```

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|H|T| D |                      zero padding                     |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   ID   | len=7 |H|T|  D  |          zero_padding              |
+-+-+-+-+-+-+-+-+-+-+-+-+-+-+-+-+-+-+-+-+-+-+-+-+-+-+-+-+-+-+-+-+
```

```
 0 1 2 3 4 5 6 7
+-+-+-+-+-+-+-+-+
| ID  |n|0|0|0|
+-+-+-+-+-+-+-+-+
```

SIGNALING CODEC MODE NOTIFICATIONS FOR MULTIMEDIA TELEPHONY SESSIONS

RELATED APPLICATION

This application is a U.S. National Phase filing under 35 U.S.C. § 371 of International Application No. PCT/US2019/059230, which claims priority to U.S. Provisional Patent Application No. 62/755,143 filed Nov. 2, 2018 and entitled "SIGNALING CODEC MODE NOTIFICATION FOR SPEECH IN IMS MULTIMEDIA TELEPHONY SESSIONS," the entire disclosures of which are incorporated by reference in their its entireties.

FIELD

Embodiments of the present disclosure relate generally to the technical field of wireless communications.

BACKGROUND

Among other things, embodiments of the present disclosure are directed to providing codec mode notification (CMN) messages for speech to be signaled from a sender to a receiver. Some embodiments may operate in conjunction with codec mode request (CMR) or real-time transport control protocol-application specific (RTCP-APP) messages.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figures 4A, 4B, 4C, 4D:
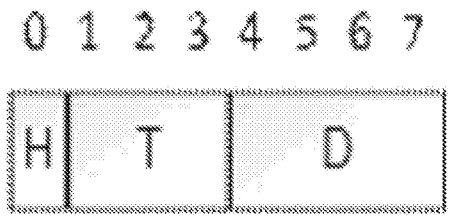
FIG. 4A illustrates an example of a notification field format in accordance with some embodiments.
FIG. 4B illustrates an example of a feedback control information (FCI) format in accordance with some embodiments.
FIG. 4C illustrates an example of a real-time transport protocol (RTP) header extension message format in accordance with some embodiments.
FIG. 4D illustrates an example of a notification field format in accordance with some embodiments.

Embodiments discussed herein may relate to providing codec mode notification (CMN) messages for speech to be signaled from a sender to a receiver. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

While temporary maximum media bitrate/temporary maximum media bitrate notification (TMMBR/TMMBN) has been previously defined and used for video rate adaptation, Internet protocol multimedia subsystem (IMS)-based speech services based on multimedia telephony service for IMS (MTSI), such as voice/video over long term evolution (VoLTE) or voice/video over new radio (VoNR), rely on speech rate adaptation using codec mode request (CMR) or real-time transport control protocol-application specific (RTCP-APP) messages. In previous solutions, both CMR and RTCP-APP messages are only used to convey the request in codec mode/rate change from the receiver to the sender. In previous solutions, however, there is no mechanism in place for speech to indicate codec mode notification from the sender to the receiver that could be used in conjunction with CMR and RTCP-APP messages.

Embodiments of the present disclosure, by contrast, provide various message formats for codec mode notification (CMN) for speech to be signaled from the sender to the receiver, and to be used in conjunction with CMR and RTCP-APP messages. Embodiments of the disclosure may help to better manage the end-to-end rate adaptation in IMS-based multimedia telephony sessions for improving quality of VoLTE calls.

Enhancement 1: For CMR and RTCP-APP

In some embodiments, real-time transport protocol (RTP)/RTCP based signaling may be defined to enable codec mode notification (CMN) for speech to be signaled from the sender to the receiver. This message may be used in conjunction with CMR and/or RTCP-APP messages, depending on whichever is negotiated for the session. In some embodiments, the CMN message is sent from the speech media sender to the speech media receiver in order to communicate an intended change in the sent speech media bitrate. The media receiver is then expected to check locally on the feasibility of the new bitrate and send a CMR or RTCP-APP message to the media sender to confirm on the new speech bitrate (or suggest a lower bitrate if necessary).

In some embodiments, the RTP/RTCP signaling may include a one byte notification. The format may align with the CMR message formats for AMR, AMR-WB and EVS codecs to allow the same codec modes to be signaled, with the difference that the message defined here is a notification message and not a request message. An example of one possible one-byte format according to some embodiments of this disclosure is depicted in FIG. 4A, where:
  H (1 bit): Header Type identification bit. For the CMR byte this bit is always set to 1;
  T (3 bits): These bits indicate the Type of Request in order to distinguish EVS AMR-WB IO and EVS Primary bandwidths; and
  D (4 bits): These bits indicate the codec mode notification, compliant with the existing CMR message formats. In some cases, such as with AMR and AMR-WB codec modes, these last 4 bits (i.e., portion 'D') may be particularly relevant.

Embodiments of the present disclosure may provide one or more of the following:
  1) A new RTCP feedback (FB) message type to carry CMN (signalled from the MTSI sender to the MTSI receiver).
  2) A new SDP parameter on the RTCP-based ability to signal CMN during the IMS/SIP based capability negotiations.
  3) A new RTP header extension type to carry CMN (signalled from the MTSI sender to the MTSI receiver).
  4) A new SDP parameter on the RTP-based ability to signal CMN during the IMS/SIP based capability negotiations.

In some embodiments, the signalling of CMN may use RTCP feedback messages. The RTCP feedback message may be identified by PT (payload type)=RTPFB (205) which refers to RTP-specific feedback message. FMT (feedback message type) can be set to the value 'X' for CMN. The RTCP feedback method may involve signaling of CMN in both of the immediate feedback and early RTCP modes.

FIG. 4B illustrates an example of a FCI (feedback control information) format. In this example, the FCI may contain exactly one instance of the CMN, composed of the following parameters:
  H (1 bit): Header Type identification bit. For the CMR byte this bit is always set to 1.
  T (3 bits): These bits indicate the Type of Request in order to distinguish EVS AMR-WB IO and EVS Primary bandwidths.
  D (4 bits): These bits indicate the codec mode notification, compliant with the existing CMR message formats. In case of AMR and AMR-WB codec modes, portion 'D' may be particularly relevant.

In some embodiments, an MTSI client supporting CMN may offer 'CMN' signaling in SDP for all media streams containing speech. CMN may be offered by including the a=rtcp-fb attribute with the CMN type under the relevant media line scope. The CMN type in conjunction with the RTCP feedback method may be expressed with the following parameter: 3gpp-cmn. A wildcard payload type ("*") may be used to indicate that the RTCP feedback attribute for CMN signaling applies to all payload types. Here is an example usage of this attribute to signal DBI relative to a media line based on the RTCP feedback method:

a=rtcp-fb:*3gpp-cmn

In some embodiments, the ABNF for rtcp-fb-val corresponding to the feedback type "3 gpp-cmn" may be given as follows:

rtcp-fb-val=/"3gpp-cmn"

In some settings, CMN may be signalled by the MTSI sender to the MTSI receiver as part of the transmitted RTP stream using RTP header extensions. An example RTP header extension message format is depicted in FIG. 4C. A 3GPP MTSI client (supporting this RTP header extension message can offer such capability in the SDP for all media streams containing speech. This capability can be offered by including the a=extmap attribute indicating a dedicated URN under the relevant media line scope. The URN corresponding to the capability to signal CMN is: urn:3gpp:cmn.

In one embodiment, the following is an example of usage of this URN in the SDP, where the number 7 in the example may be replaced with any number in the range 1-14:

a=extmap:7urn:3gpp:cmn

Enhancement 2: For RTCP-APP Only

In some embodiments, RTCP-APP may be modified to include a new 1-bit field to indicate notification. A corresponding message format include a single bit 'n,' an example of which is depicted in FIG. 4D. In this example, 'n' is set to '1' if RTCP-APP message contains a notification and to '0' otherwise.

Some embodiments may include changes to SDP syntax. In some embodiments, RTCP-APP request messages that can be used are negotiated with SDP using the '3gpp_mtsi_app_adapt' attribute. In one example, the syntax for the 3GPP MTSI RTCP-APP adaptation attribute is:

a=3gpp_mtsi_app_adapt:<reqNames> where:
<reqNames> is a comma-separated list identifying the different request messages (see below).
In some embodiments, the ABNF for the RTCP-APP adaptation messages negotiation attribute may be the following:
adaptation attribute="a" "=" "3gpp_mtsi_app_adapt" ":" reqName *("," reqName)
reqName="RedReq"/"FrameAggReq"/"AmrCmr"/ "EvsRateReq"/"EvsBandwidthReq"/"EvsParRedReq"/ "EvsIoModeReq"/"EvsPrimaryModeReq"/"Notification"

Figure 4E:
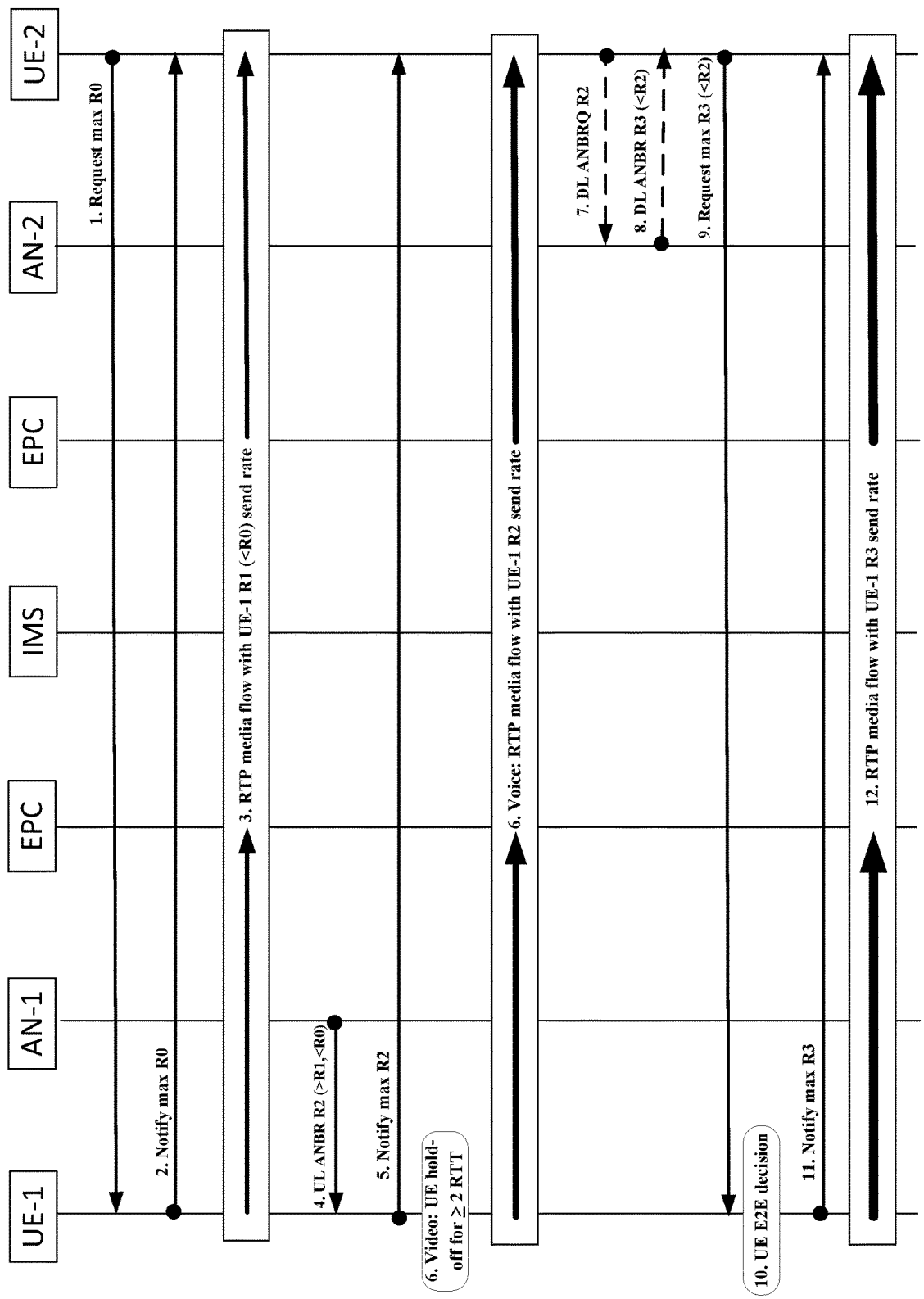
FIG. 4E illustrates an example of a signaling flow in accordance with some embodiments.

FIG. 4E illustrates an example of a signaling flow depicting the use of a proposed CMN signaling according to some embodiments of this disclosure. In particular, in Step 5, CMN signaling is used by the media sender to notify the media receiver about the intended change in the sent bitrate. In the example depicted in FIG. 4E, the signaling diagram describes ANBR usage for speech. The "Request max" message in this figure may be a generalized application level message that corresponds to CMR or RTCP-APP. Similarily, the "Notify max" message may be a generalized application level message that corresponds to the proposed CMN messages described herein.

Figure 5:
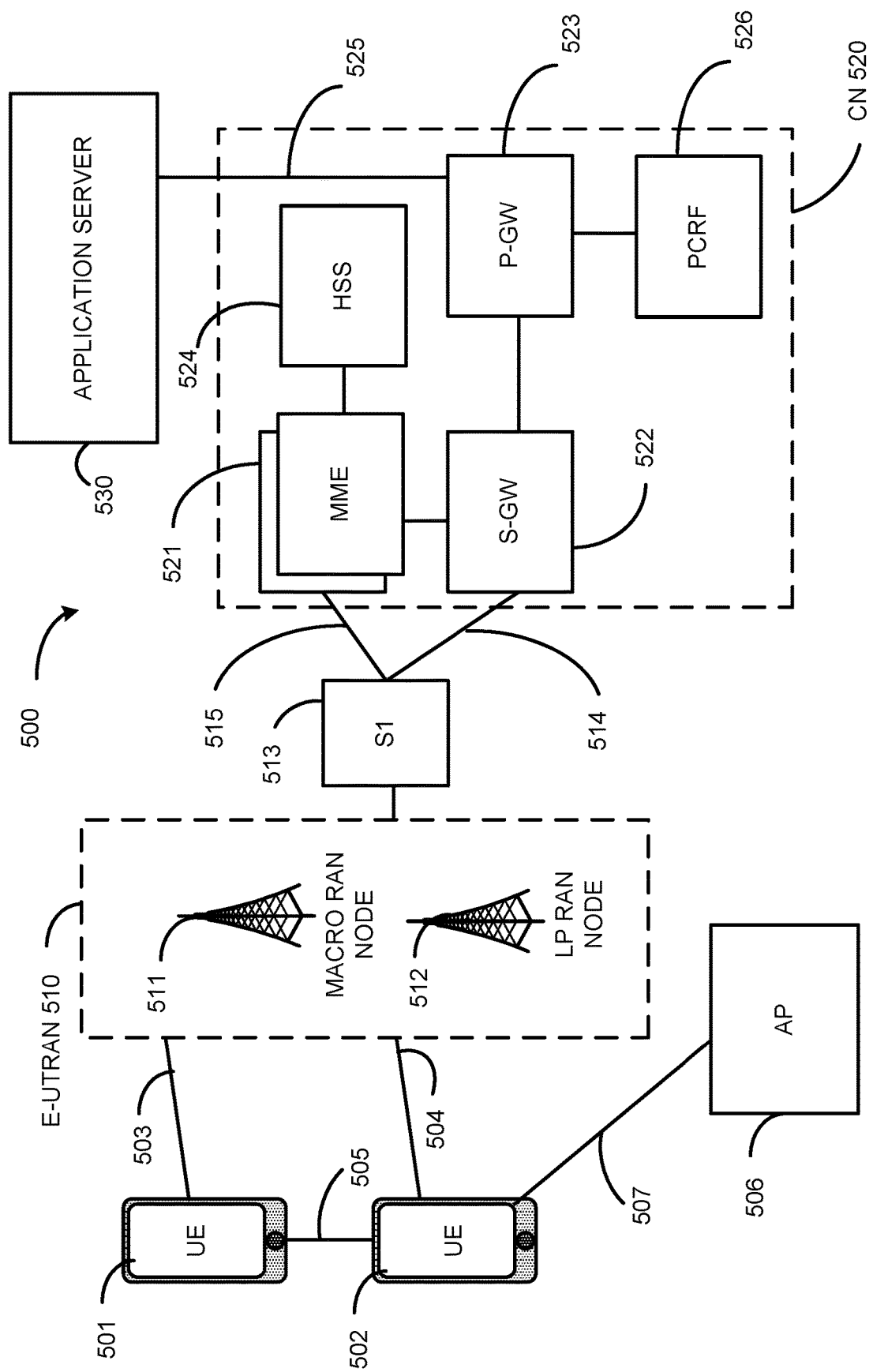
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be anode for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
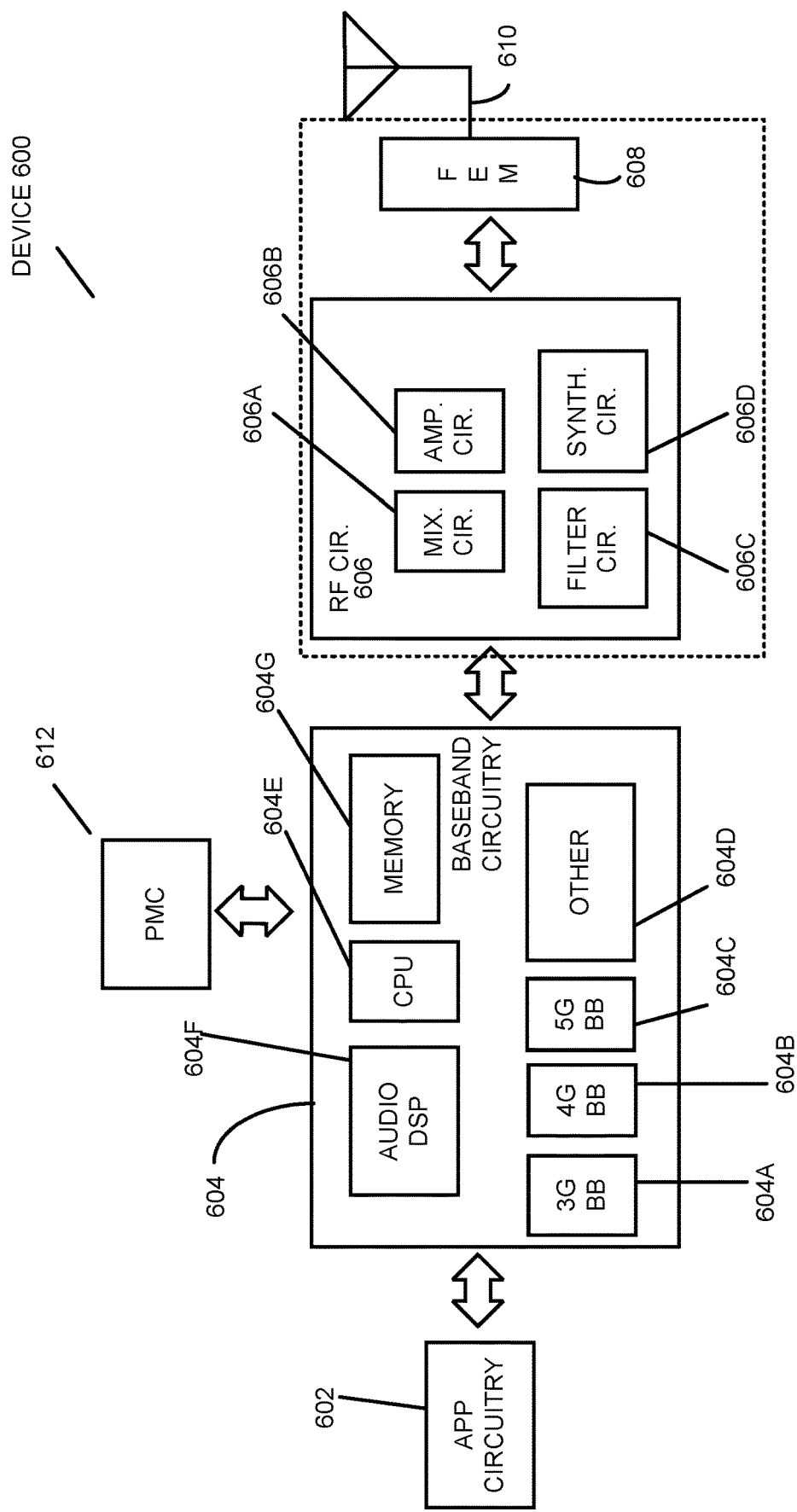
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
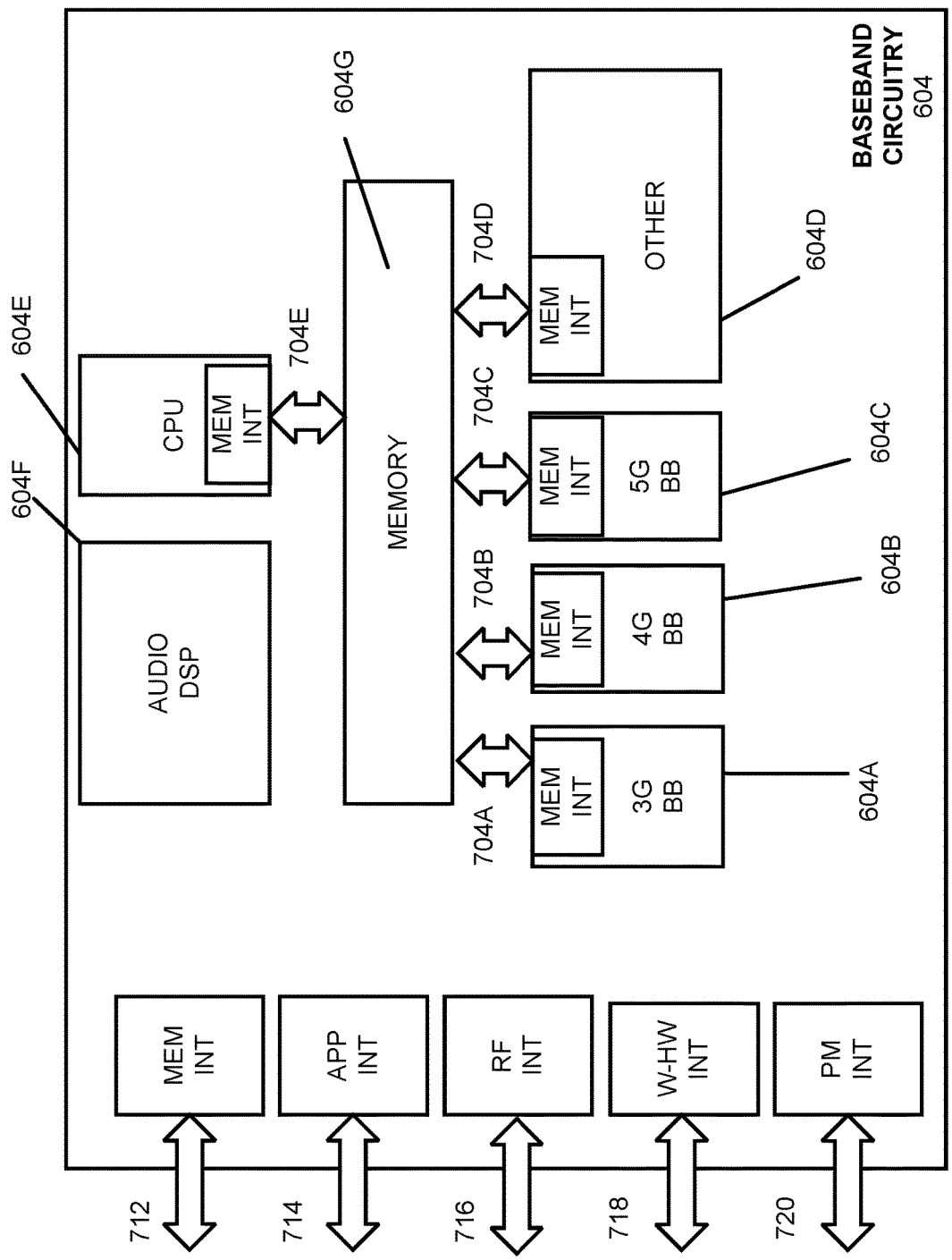
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
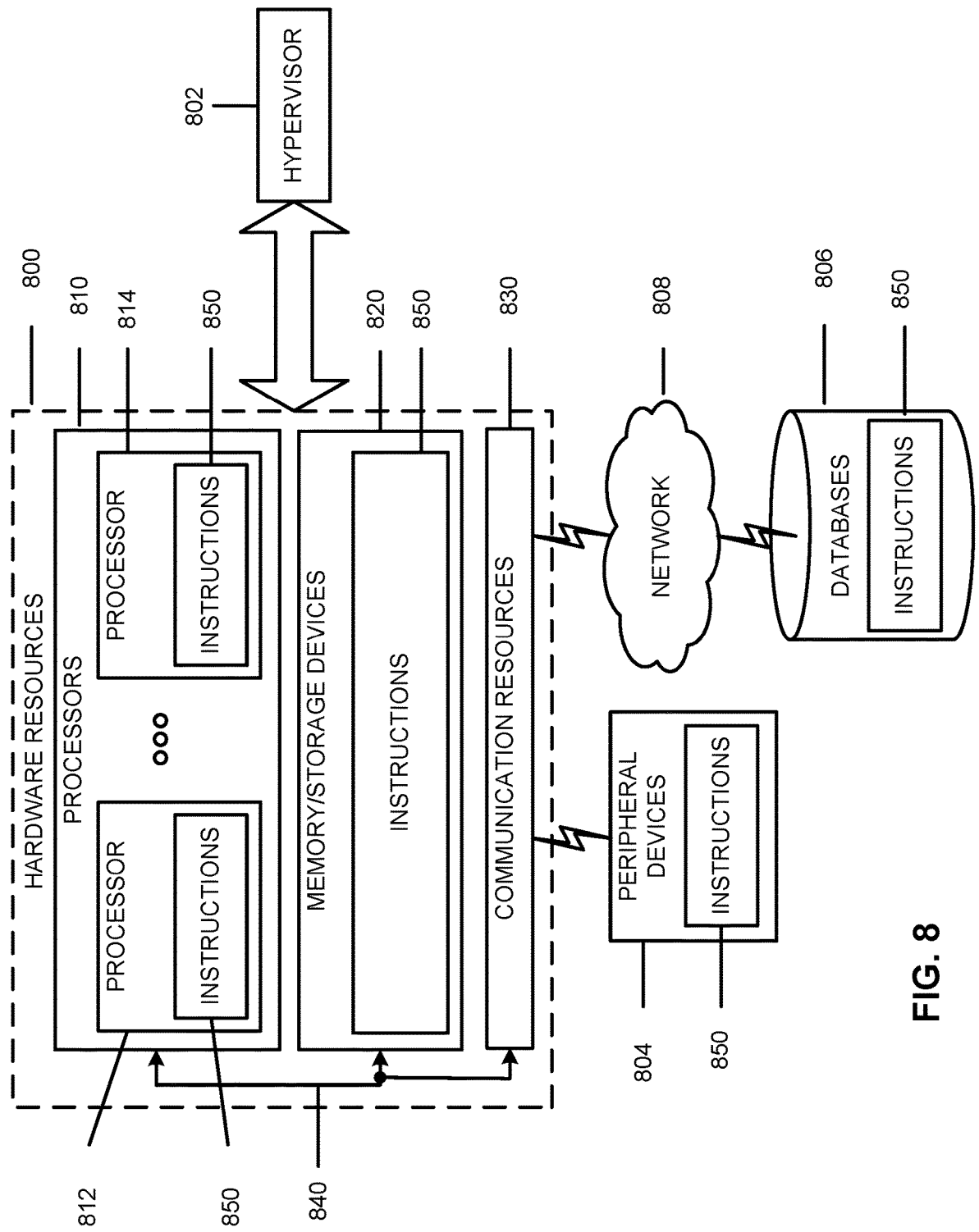
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a user equipment (UE) in accordance with some embodiments. In this example, operation flow/algorithmic structure 100 may include, at 105, retrieving, from memory, codec mode notification (CMN) information that is to inform a remote UE of an intended change of a codec mode. Operation flow/algorithmic structure 100 may further include, at 110, generating a message that includes the CMN information.

Operation flow/algorithmic structure 100 may further include, at 115, encoding the message for transmission to the remote UE.

Another example of an operation flow/algorithmic structure is depicted in FIG. 2, which may be performed by a UE in accordance with some embodiments. In this example, operation flow/algorithmic structure 200 may include, at 205, receiving, by a first UE from a second UE, a codec mode notification (CMN) message that includes information that is to inform a first UE of an intended change of a codec mode. Operation flow/algorithmic structure 200 may further include, at 210, generating, by the first UE, a confirmation message based on the CMN message. Operation flow/algorithmic structure 200 may further include, at 215, encoding the confirmation message for transmission to the second UE.

Another example of an operation flow/algorithmic structure is depicted in FIG. 3, which may be performed by a UE in accordance with some embodiments. In this example, operation flow/algorithmic structure 300 may include, at 305, generating an application layer message that includes codec mode notification (CMN) information for informing a remote UE of an intended change of a codec mode. Operation flow/algorithmic structure 300 may further include, at 310, encoding the application layer message for transmission to the remote UE.

EXAMPLES

Some non-limiting examples are provided below.

Example 1 includes an apparatus of a user equipment (UE) comprising: memory to store codec mode notification (CMN) information that is to inform a remote UE of an intended change of a codec mode; and processing circuitry, coupled with the memory, to: retrieve the CMN information from the memory; generate a message that includes the CMN information; and encode the message for transmission to the remote UE.

Example 2 includes the apparatus of example 1 or some other example herein, wherein the message is an application layer real-time transport protocol (RTCP) feedback message.

Example 3 includes the apparatus of example 2 or some other example herein, wherein the processing circuitry is further to: receive a session description protocol (SDP) offer message from the remote UE that includes an RTCP feedback attribute that is to indicate the remote UE supports reception of codec mode notifications signaled via RTCP feedback messages.

Example 4 includes the apparatus of example 2 or some other example herein, wherein the processing circuitry is further to: receive a session description protocol (SDP) answer message from the remote UE that includes an RTCP feedback attribute that is to indicate the remote UE supports transmission of codec mode notifications signaled via RTCP feedback messages.

Example 5 includes the apparatus of example 1 or some other example herein, wherein the message is an application layer message comprising a real-time protocol (RTP) header extension that includes the CMN information.

Example 6 includes the apparatus of example 5 or some other example herein, wherein the processing circuitry is further to: receive a session description protocol (SDP) offer message from the remote UE that includes an extension map attribute that is to indicate the remote UE supports reception of codec mode notifications signaled via RTP header extension messages.

Example 7 includes the apparatus of example 5 or some other example herein, wherein the processing circuitry is further to: receive a session description protocol (SDP) answer message from the remote UE that includes an extension map attribute that is to indicate the remote UE supports transmission of codec mode notifications signaled via RTP header extension messages.

Example 8 includes one or more computer-readable media storing instructions that, when executed by one or more processors, cause a first user equipment (UE) to: receive, from a second UE, a codec mode notification (CMN) message that includes information that is to inform the first UE of an intended change of a codec mode; generate a confirmation message based on the CMN message; and encode the confirmation message for transmission to the second UE.

Example 9 includes the one or more computer-readable media of example 8 or some other example herein, wherein the information in the CMN message is to communicate an intended change in a media bitrate, and wherein the confirmation message is to confirm the intended change in the media bitrate or to suggest an alternate bitrate.

Example 10 includes the one or more computer-readable media of example 8 or some other example herein, wherein the CMN message is a real-time transport protocol (RTCP) feedback message that includes the CMN information.

Example 11 includes the one or more computer-readable media of example 8 or some other example herein, wherein: the confirmation message is a session description protocol (SDP) offer message that includes an RTCP feedback attribute that is to indicate the UE supports reception of codec mode notifications signaled via RTCP feedback messages; or the confirmation message is a session description protocol (SDP) answer message that includes an RTCP feedback attribute that is to indicate the UE supports transmission of codec mode notifications signaled via RTCP feedback messages.

Example 12 includes the one or more computer-readable media of example 8 or some other example herein, wherein the CMN message is an application layer message comprising a real-time protocol (RTP) header extension that includes the CMN information.

Example 13 includes the one or more computer-readable media of example 8 or some other example herein, wherein: the confirmation message is a session description protocol (SDP) offer message that includes an extension map attribute that is to indicate the UE supports reception of codec mode notifications signaled via RTP header extension messages; or the confirmation message is a session description protocol (SDP) answer message that includes an extension map attribute that is to indicate the UE supports transmission of codec mode notifications signaled via RTP header extension messages.

Example 14 includes one or more computer-readable media storing instructions that, when executed by one or more processors, cause a user equipment (UE) to: generate an application layer message that includes codec mode notification (CMN) information for informing a remote UE of an intended change of a codec mode; and encode the application layer message for transmission to the remote UE.

Example 15 includes the one or more computer-readable media of example 14 or some other example herein, wherein the application layer message is a real-time transport protocol (RTCP) feedback message that includes the CMN information.

Example 16 includes the one or more computer-readable media of example 15 or some other example herein, wherein the media further stores instructions for causing the UE to: receive a session description protocol (SDP) offer message from the remote UE that includes an RTCP feedback attribute that is to indicate the remote UE supports reception of codec mode notifications signaled via RTCP feedback messages.

Example 17 includes the one or more computer-readable media of example 15 or some other example herein, wherein the media further stores instructions for causing the UE to: receive a session description protocol (SDP) answer message from the remote UE that includes an RTCP feedback attribute that is to indicate the remote UE supports transmission of codec mode notifications signaled via RTCP feedback messages.

Example 18 includes the one or more computer-readable media of example 14 or some other example herein, wherein the application layer message comprises a real-time protocol (RTP) header extension that includes the CMN information.

Example 19 includes the one or more computer-readable media of example 18 or some other example herein, wherein the media further stores instructions for causing the UE to: receive a session description protocol (SDP) offer message from the remote UE that includes an extension map attribute that is to indicate the remote UE supports reception of codec mode notifications signaled via RTP header extension messages.

Example 20 includes the one or more computer-readable media of example 18 or some other example herein, wherein the media further stores instructions for causing the UE to: receive a session description protocol (SDP) answer message from the remote UE that includes an extension map attribute that is to indicate the remote UE supports transmission of codec mode notifications signaled via RTP header extension messages.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. A user equipment (UE) comprising:
    memory to store codec mode notification (CMN) information in the UE that is a speech media sender UE, wherein the CMN information is to inform a remote UE that is a speech media receiver UE of an intended change of a codec mode and a change in sent bitrate from the speech media sender to the speech media receiver UE; and
    processing circuitry, coupled with the memory, to:
        retrieve the CMN information from the memory;
        generate a notification message that includes the CMN information including one byte notification with 4 bits to indicate that the notification message is a notification and not a request; and
        encode the notification message for transmission to the remote UE.

2. The UE of claim 1, wherein the notification message is an application layer real-time transport protocol (RTCP) feedback message and the notification message includes a notification byte having a one-bit header type identification bit and the CMN information.

3. The UE of claim 2, wherein the processing circuitry is further to:
    receive a session description protocol (SDP) offer message from the remote UE that includes an RTCP feedback attribute that is to indicate the remote UE supports reception of codec mode notifications signaled via RTCP feedback messages.

4. The UE of claim 2, wherein the processing circuitry is further to:
    receive a session description protocol (SDP) answer message from the remote UE that includes an RTCP feedback attribute that is to indicate the remote UE supports transmission of codec mode notifications signaled via RTCP feedback messages.

5. The UE of claim 1, wherein the notification message is an application layer message comprising a real-time protocol (RTP) header extension that includes the CMN information.

6. The UE of claim 5, wherein the processing circuitry is further to:
    receive a session description protocol (SDP) offer message from the remote UE that includes an extension map attribute that is to indicate the remote UE supports reception of codec mode notifications signaled via RTP header extension messages.

7. The UE of claim 5, wherein the processing circuitry is further to:
    receive a session description protocol (SDP) answer message from the remote UE that includes an extension map attribute that is to indicate the remote UE supports transmission of codec mode notifications signaled via RTP header extension messages.

8. One or more non-transitory computer-readable media storing instructions that, when executed by one or more processors, cause a first user equipment (UE) to:

receive, from a second UE that is a speech media sender UE, a codec mode notification (CMN) message that includes one byte notification with 4 bits to indicate that the CMN message is a notification and not a request and information that is to inform the first UE that is a speech media receiver UE of an intended change of a codec mode and a change in sent bitrate from the speech media sender to the speech media receiver UE;
generate a confirmation message based on the CMN message; and
encode the confirmation message for transmission to the second UE.

9. The one or more non-transitory computer-readable media of claim 8, wherein the information in the CMN message is to communicate an intended change in a media bitrate, and wherein the confirmation message is to confirm the intended change in the media bitrate or to suggest an alternate bitrate.

10. The one or more non-transitory computer-readable media of claim 8, wherein the CMN message is a real-time transport protocol (RTCP) feedback notification message that includes a notification byte having a one-bit header type identification bit and the CMN information.

11. The one or more non-transitory computer-readable media of claim 8, wherein:
the confirmation message is a session description protocol (SDP) offer message that includes an RTCP feedback attribute that is to indicate the UE supports reception of codec mode notifications signaled via RTCP feedback messages; or
the confirmation message is an SDP answer message that includes an other RTCP feedback attribute that is to indicate the UE supports transmission of codec mode notifications signaled via RTCP feedback messages.

12. The one or more non-transitory computer-readable media of claim 8, wherein the CMN message is an application layer message comprising a real-time protocol (RTP) header extension that includes the CMN information.

13. The one or more non-transitory computer-readable media of claim 8, wherein:
the confirmation message is a session description protocol (SDP) offer message that includes an extension map attribute that is to indicate the UE supports reception of codec mode notifications signaled via RTP header extension messages; or
the confirmation message is a SDP answer message that includes an other extension map attribute that is to indicate the UE supports transmission of codec mode notifications signaled via RTP header extension messages.

14. One or more non-transitory computer-readable media storing instructions that, when executed by one or more processors, cause a user equipment (UE) to:
generate an application layer message that includes codec mode notification (CMN) information stored in the UE that is a speech media sender UE for informing a remote UE that is a speech media receiver UE of an intended change of a codec mode and a change in sent bitrate from the speech media sender to the speech media receiver UE, wherein the CMN information includes one byte notification with 4 bits to indicate that the application layer message is a notification and not a request; and
encode the application layer message as a notification message for transmission to the remote UE.

15. The one or more non-transitory computer-readable media of claim 14, wherein the application layer message is a real-time transport protocol (RTCP) feedback notification message that includes a notification byte having a one-bit header type identification bit and the CMN information.

16. The one or more non-transitory computer-readable media of claim 15, wherein the one or more non-transitory computer-readable media further stores instructions for causing the UE to:
receive a session description protocol (SDP) offer message from the remote UE that includes an RTCP feedback attribute that is to indicate the remote UE supports reception of codec mode notifications signaled via RTCP feedback messages.

17. The one or more non-transitory computer-readable media of claim 15, wherein the one or more non-transitory computer-readable media further stores instructions for causing the UE to:
receive a session description protocol (SDP) answer message from the remote UE that includes an RTCP feedback attribute that is to indicate the remote UE supports transmission of codec mode notifications signaled via RTCP feedback messages.

18. The one or more non-transitory computer-readable media of claim 14, wherein the application layer message comprises a real-time protocol (RTP) header extension that includes the CMN information.

19. The one or more non-transitory computer-readable media of claim 18, wherein the one or more non-transitory computer-readable media further stores instructions for causing the UE to:
receive a session description protocol (SDP) offer message from the remote UE that includes an extension map attribute that is to indicate the remote UE supports reception of codec mode notifications signaled via RTP header extension messages.

20. The one or more non-transitory computer-readable media of claim 18, wherein the one or more non-transitory computer-readable media further stores instructions for causing the UE to:
receive a session description protocol (SDP) answer message from the remote UE that includes an extension map attribute that is to indicate the remote UE supports transmission of codec mode notifications signaled via RTP header extension messages.

* * * * *